3,101,342
DIQUATERNARY BIS-[4-ALKYLTHIO-PYRIDYL-(1)]-ALKANES

Klaus Thomas and Dietrich Jerchel, Biberach an der Riss, Germany, assignors to Dr. Karl Thomae G.m.b.H., Biberach an der Riss, Germany, a corporation of Germany
No Drawing. Filed May 9, 1961, Ser. No. 108,770
Claims priority, application Germany May 14, 1960
8 Claims. (Cl. 260—294.8)

This invention relates to diquaternary bis-[4-alkylthio-pyridyl-(1)]-alkanes as well as to a method of preparing such compounds.

More particularly, the present invention relates to diquaternary compounds of the formula

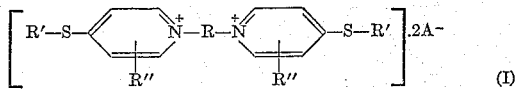

wherein

R is alkylene with 1 to 10 carbon atoms,
R' is straight or branched chain alkyl with 1 to 16 carbon atoms,
R" is hydrogen or lower alkyl, and
A is the anion of an inorganic or organic acid, preferably of a hydrohalic acid or an aromatic sulfonic acid.

The diquaternary compounds according to the present invention are most conveniently prepared by reacting a 4-alkylthio-pyridine of the formula

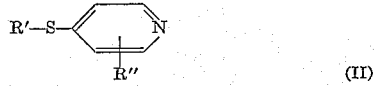

wherein R' and R" have the meanings previously defined in connection with Formula I, with a compound of formula $$A—R—A \qquad (III)$$

wherein A and R also have the meanings previously defined in connection with Formula I. The reaction is carried out by heating a mixture of the starting materials to elevated temperatures, preferably to temperatures above 100° C. and below the decomposition temperature of the reaction components, and advantageously in the presence of an inert organic solvent, such as an alcohol, an aromatic hydrocarbon, dioxane and the like. Two mols of the 4-alkylthio-pyridine are used for each mol of Compound III. The inert solvent medium should preferably be one which has a boiling point above 100° C., so that the optimum reaction temperature coincides with the boiling point of the particular solvent. In the event that the boiling point of Compound III and/or of the inert solvent is below 100° C., the reaction may be carried out at elevated pressures so as to raise the boiling point of the reaction mixture above 100° C.

The reaction mixture is worked up by evaporating the inert solvent and recrystallizing or reprecipitating the residue. The yields of the purified end products are about 30–60% of theory.

The 4-alkylthio-pyridines (II) used as one of the starting materials are either well known compounds or may be prepared by known methods, such as by the method described in Chemische Berichte, vol. 89, page 2923 (1956).

The following examples illustrate the preparation of a few representative members of the group of diquaternary compounds embraced by Formula I above. It will be understood, however, that these examples are given for purposes of illustration only and that the present invention is not limited to these examples.

EXAMPLE I

1,4-Bis-[4'-(n-Cetyl-Thio)-Pyridinium-(1')]-n-Butane Dibromide

A mixture of 5 gm. of 4-(n-cetyl-thio)-pyridine, 1.65 gm. of 1,4-dibromo-butane and 50 cc. of butanol was heated for six hours at 115° C. Thereafter, the butanol was distilled off in vacuo and the residue was reprecipitated from a mixture of methanol and ether. 3 gm. of the diquaternary compound of the formula

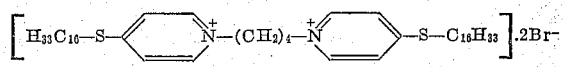

were obtained. The product had a melting point of 138° C. (decomposition).

EXAMPLE II

1,10-Bis-[4'-(n-Butyl-Thio)-Pyridinium-(1')]-n-Decane Dibromide

A mixture of 8.35 gm. of 4-(n-butyl-thio)-pyridine, 7.5 gm. of 1,10-dibromo-n-decane and 80 cc. of butanol was heated for six hours at 115° C. Thereafter, the reaction mixture was concentrated by evaporation in vacuo, and the residue was reprecipitated from a mixture of methanol and ether. 5 gm. of the diquaternary compound of the formula

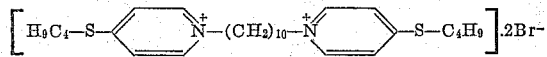

were obtained. The product had a melting point of 108–110° C.

EXAMPLE III

1,6-Bis-[4'-(n-Cetyl-Thio)-Pyridinium-(1')]-n-Hexane Dibromide

A mixture of 8.5 gm. of 4-(n-cetyl-thio)-pyridine, 3.0 gm. of 1,6-dibromo-n-hexane and 10 cc. of n-butanol was heated for eight hours at 90° C. Thereafter, the reaction mixture was allowed to cool, was dissolved in ethanol and the reaction product was precipitated by adding ether to the ethanol solution. 3.5 gm. (32% of theory) of the diquaternary compound of the formula

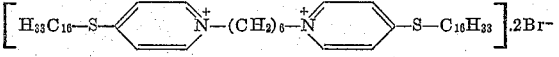

were obtained. The product decomposed at 230° C.

EXAMPLE IV

1,2-Bis-[4'-(n-Cetyl-Thio)-Pyridinium-(1')]-Ethane Dibromide

A mixture of 17 gm. of 4-(n-cetyl-thio)-pyridine, 4.5 gm. of 1,2-dibromo-ethane and 50 cc. of n-butanol was refluxed for six hours. After distilling off the butanol and reprecipitating the product from a mixture of ethanol and ether, 10 gm. (46.5% of theory) of the diquaternary compound of the formula

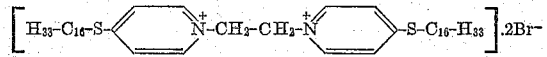

were obtained. The product had a melting point of 200° C.

EXAMPLE V

1,6-Bis-[3'-Methyl-4'-(n-Cetyl-Thio)-Pyridinium-(1')]-n-Hexane Dibromide

A mixture of 3.5 gm. of 3-methyl-4-(n-cetyl-thio)-pyridine, 1.2 gm. of 1,6-dibromo-n-hexane and 70 cc. n-butanol was heated for twelve hours at 120° C. Thereafter, the butanol was distilled off and the residue was reprecipitated from a mixture of ethanol and ether. 2.5 gm. (54% of theory) of the diquaternary compound of the formula

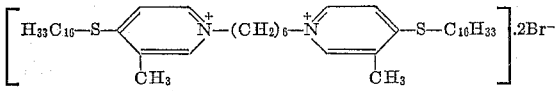

were obtained. The product had a melting point of 154–158° C.

EXAMPLE VI

*1,10-Bis-[4'-(Ethyl-Thio)-Pyridinium-(1')]-n-Decane Dibromide*

A mixture of 5 gm. of 4-(ethyl-thio)-pyridine, 5.4 gm. of 1,10-dibromo-n-decane and 200 cc. of acetonitrile was refluxed for ten hours. Thereafter, the reaction mixture was concentrated by evaporation, allowed to cool, and the residue was admixed with ether, whereby a precipitate formed which was separated. 3.2 gm. (29% of theory) of the diquaternary compound of the formula

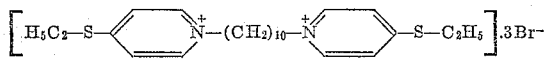

were obtained. The raw product had a melting point of 89–92° C. It may be purified by reprecipitation from a mixture of ethanol and ether.

EXAMPLE VII

*1,10-Bis-[4'-(n-Octyl-Thio)-Pyridinium-(1')]-n-Decane Dibromide*

A mixture of 12 gm. of 4-(n-octyl-thio)-pyridine, 14 gm. of 1,10-dibromo-n-decane and 70 cc. of acetonitrile was refluxed for three hours. Thereafter, the reaction mixture was admixed with ethylacetate to precipitate the raw reaction product, which was reprecipitated from a mixture of ethanol and ethylacetate. 12 gm. (75% of theory) of the diquaternary compound of the formula

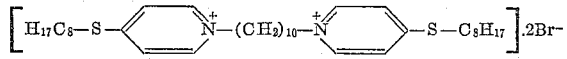

were obtained. The product had a melting point of 96–98° C.

EXAMPLE VIII

*1,10-Bis-[4'-(n-Cetyl-Thio)-Pyridinium-(1')]-n-Decane Di-(p-Toluene-Sulfonate)*

A mixture of 4.65 gm. of 4-(n-cetyl-thio)-pyridine, 3.35 gm. of decamethyleneglycol-(1,10)-di-p-toluene-sulfonate and 75 cc. of xylene was heated for seven hours at 130° C. on an oil bath. Thereafter, the reaction mixture was allowed to cool and was then admixed with ethylacetate to precipitate the reaction product. The raw product was repeatedly reprecipitated from a mixture of alcohol and ethylacetate. 1.35 gm. (17% of theory) of the diquaternary compound of the formula

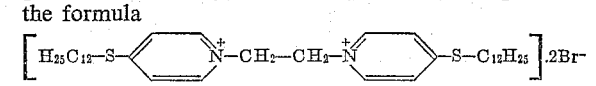

were obtained. The product had a melting point of 108–110° C.

EXAMPLE IX

*1,10-Bis-[4'-(n-Cetyl-Thio)-Pyridinum-(1')]-n-Decane Dibromide*

8.5 gm. of 4-(n-cetyl-thio)-pyridine were dissolved in n-butanol, and to the resulting solution 3.75 gm. of 1,10-dibromo-n-decane were added. The reaction mixture was then refluxed for twelve hours. Thereafter, it was allowed to cool, whereby the reaction product precipitated out. The precipitate was reprecipitated from a mixture of ethanol and ether, yielding 3 gm. (25% of theory) of the diquaternary compound of the formula

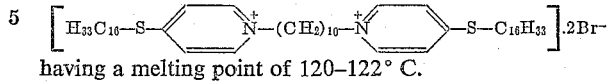

having a melting point of 120–122° C.

EXAMPLE X

*1,10-Bis-[4'-Allyl-Thio)-Pyridinium-(1')]-n-Decane Dibromide*

A mixture of 8 gm. of 4-(allyl-thio)-pyridine, 10 gm. of 1,10-dibromo-n-decane and 50 cc. of acetonitrile was heated for eight hours at the boiling point. Thereafter, the reaction mixture was concentrated by evaporation and the reaction product was precipitated from the evaporation residue by adding ethylacetate thereto. 13.5 gm. (84% of theory) of the diquaternary compound of the formula

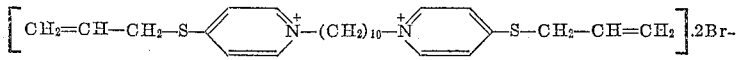

were obtained. After reprecipitation from a mixture of ethanol and ethylacetate the product had a melting point of 109–111° C.

EXAMPLE XI

*1,10-Bis-[4'-(Isopropyl-Thio)-Pyridinium-(1')]-n-Decane Dibromide*

A mixture of 11.5 gm. of 4-(isopropyl-thio)-pyridine, 15 gm. of 1,10-dibromo-n-decane and 100 cc. of n-butanol was refluxed for five hours. After cooling, the reaction product was precipitated by adding ethylacetate to the reaction mixture. 15.5 gm. (68% of theory) of the quaternary compound of the formula

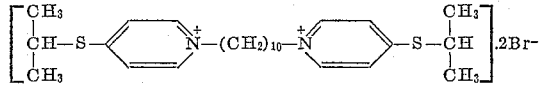

were obtained. The product had a melting point of 95–97° C.

EXAMPLE XII

*1,10-Bis-[4'-(Sec. Butyl-Thio)-Pyridinium-(1')]-n-Decane Dibromide*

A mixture of 2.5 gm. of 4-(sec. butyl-thio)-pyridine, 2.25 gm. of 1,10-dibromo-n-decane and 30 cc. of n-butanol was refluxed for eight hours. Thereafter, the reaction mixture was concentrated by evaporation, the residue was allowed to cool and ethylacetate was added thereto to precipitate the reaction product. The precipitate was reprecipitated from a mixture of ethanol and ethylacetate, yielding 2.8 gm. (58% of theory) of the diquaternary compound of the formula

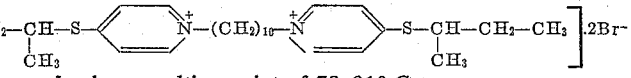

having a melting point of 79–81° C.

EXAMPLE XIII

*1,2-Bis-[4'-(n-Dodecyl-Thio)-Pyridinium-(1')]-Ethane Dibromide*

A mixture of 5.6 gm. of 4-(n-dodecyl-thio)-pyridine, 2 gm. of 1,2-dibromoethane and 40 cc. of acetonitrile was refluxed for fourteen hours. Thereafter, the reaction mixture was allowed to cool, whereby the reaction product precipitated out. The precipitate was separated by vacuum filtration and was recrystallized from ethanol. 1.5 gm. 20% of theory of the diquaternary compound of the formula

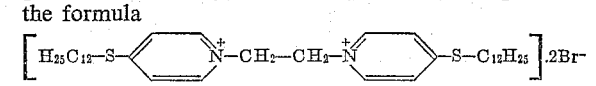

were obtained. The product had a melting point of 275° C.

EXAMPLE XIV

*1,6-Bis-[4'-(n-Butyl-Thio)-Pyridinium-(1')]-n-Hexane Dibromide*

A mixture of 4.0 gm. of 4-(n-butyl-thio)-pyridine, 2.9 gm. of 1,6-dibromo-n-hexane and 40 cc. of acetonitrile was refluxed for fourteen hours. Thereafter, the reaction mixture was allowed to cool and then the reaction product was precipitated by adding ether to the reaction solution. The precipitate was separated and reprecipitated from a mixture of ethanol and ether. 5.0 gm. (72% of theory) of the diquaternary compound of the formula

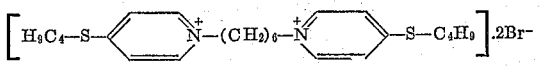

were obtained. The product had a melting point of 104° C.

EXAMPLE XV

*1,8-Bis-[4'-(Isopropyl-Thio)-Pyridinium-(1')]-n-Octane Dibromide*

A mixture of 6.1 gm. of 4-(isopropyl-thio)-pyridine, 5.4 gm. of 1,8-dibromo-n-octane and 40 cc. of dimethylformamide was heated for eight hours at 80–90° C. Thereafter, the reaction solution was allowed to cool, and then the reaction product was precipitated by adding ethylacetate to the reaction solution. 10.2 gm. (89% of theory) of the diquaternary compound of the formula

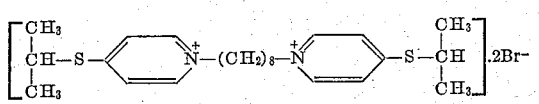

were obtained. The product had a melting point of 140–145° C.

The diquaternary compounds according to the present invention are useful in that they exhibit excellent bactericidal and fungicidal properties, especially against bacteria and fungi which are usually difficult to combat. For example, the compounds embraced by Formula I above are especially effective against *Aspergillus niger* and *Candida albicans*. In this respect they are considerably and unexpectedly superior to known pyridinium compounds. Moreover, the compounds according to the present invention exhibit very satisfactory diffusion properties and do not show any incompatibility toward albumin. Consequently, they are eminently suited for use as active ingredients in disinfectant and fungicidal compositions adapted for employment in the home, in hospitals as well as in industry.

While we have illustrated our invention with the aid of certain specific embodiments thereof, it will be readily apparent to those skilled in the art that the present invention is not limited solely to those particular embodiments, and that various changes and modifications may be made without departing from the spirit of the invention or the scope of the appended claims.

We claim:

1. Diquaternary compounds of the formula

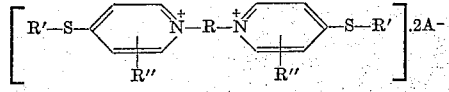

wherein

R is alkylene of 1 to 10 carbon atoms,

R' is selected from the group consisting of straight or branched chain alkyl of 1 to 16 carbon atoms and alkenyl of 3 carbon atoms, R" is selected from the group consisting of hydrogen and methyl, and A is the anion of an acid selected from the group consisting of hydrohalic acids and p-toluene sulfonic acid.

2. 1,10-bis-[4'-(n-butyl-thio)-pyridinium - (1')] - n-decane dibromide.

3. 1,10 - bis - [4' - (ethyl-thio)-pyridinium-(1')]-n-decane dibromide.

4. 1,10 - bis - [4' - (n-octyl-thio)-pyridinium-(1')]-n-decane dibromide.

5. 1,10 - bis - [4' - (allyl-thio)-pyridinium-(1')]-n-decane dibromide.

6. 1,10 - bis - [4'-(isopropyl-thio)-pyridinium-(1')]-n-decane dibromide.

7. The process of preparing diquaternary compounds of the formula

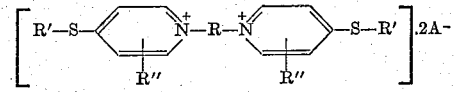

wherein

R is alkylene of 1 to 10 carbon atoms,

R' is selected from the group consisting of straight or branched chain alkyl of 1 to 16 carbon atoms and lower alkenyl, R" is selected from the group consisting of hydrogen and lower alkyl, and A is the anion of an acid selected from the group consisting of hydrohalic acids and p-toluene sulfonic acid, which comprises reacting a 4-(alkyl-thio)-pyridine of the formula

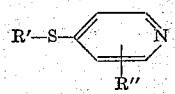

wherein R' and R" have the meanings defined above, with a disubstituted alkane of the formula

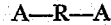

wherein A is selected from the group consisting of p-toluyl-sulfonyl and halogen and R has the meanings defined above, at a temperature above 100° C. but below the decomposition temperature of the reactants and reaction product.

8. The process according to claim 7, wherein said reaction is carried out in the presence of an inert organic solvent.

References Cited in the file of this patent
UNITED STATES PATENTS 2,909,527    Shapiro et al.          Oct. 20, 1959
2,909,528    Shapiro et al.          Oct. 20, 1959

OTHER REFERENCES

Noller: "Chemistry of Organic Compound," 2nd edition, page 272 (1957) (Saunders).